Patented July 1, 1930

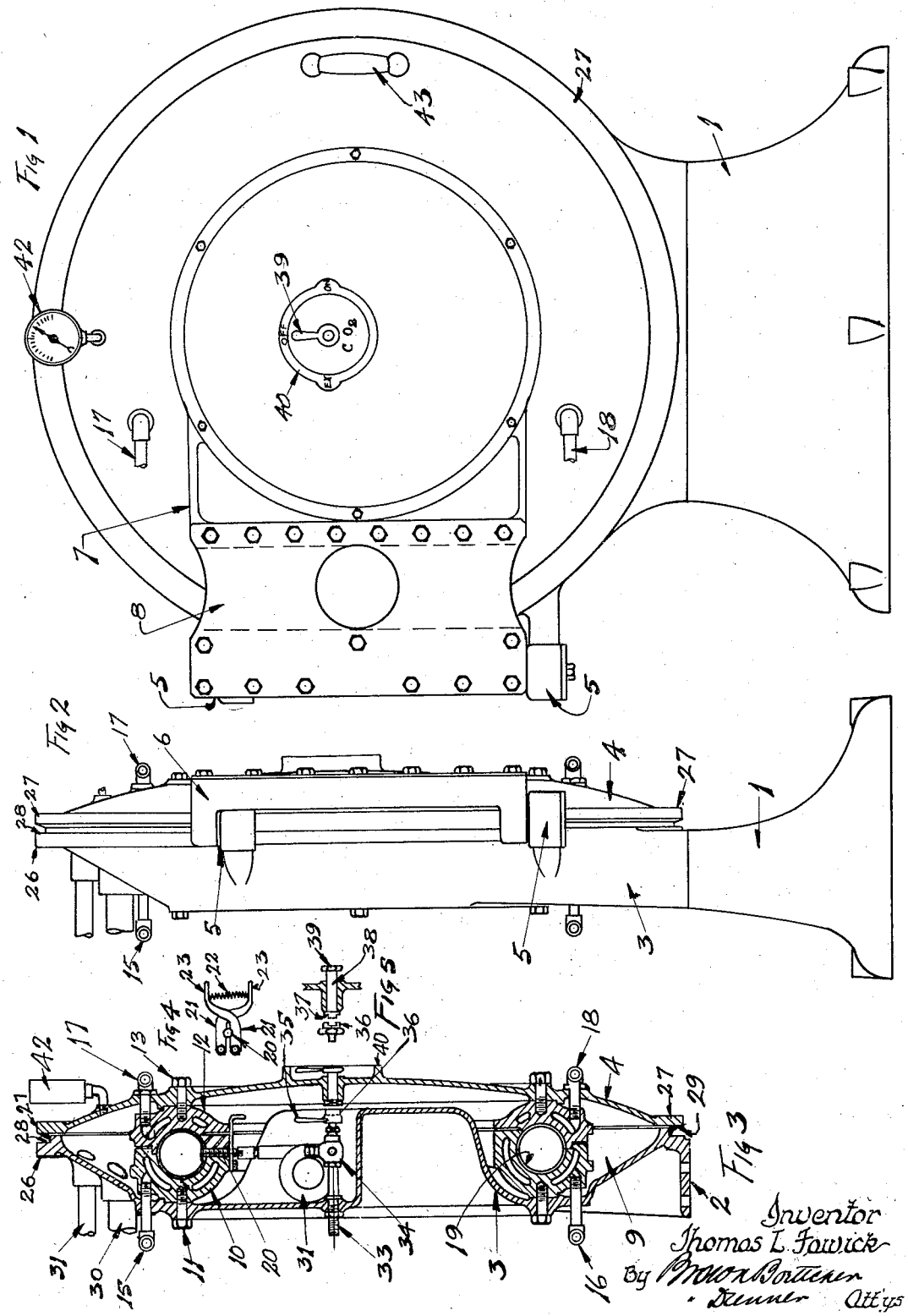

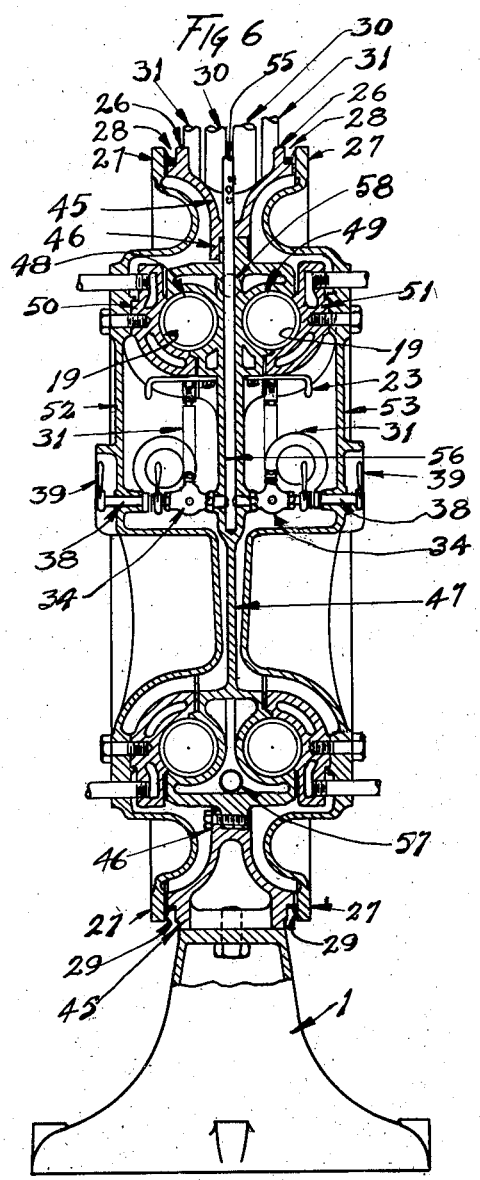

1,768,590

UNITED STATES PATENT OFFICE

THOMAS L. FAWICK, OF RACINE, WISCONSIN

MOLD

Application filed October 3, 1927. Serial No. 223,530.

My invention relates to curing molds and the like for hollow molded articles. While the specific device which I shall herein describe and illustrate comprises a mold for curing inner tubes, it is to be understood that the invention is applicable to molds for other articles as well.

In molds for curing inner tubes as now employed in the art, it is customary to introduce a gas ($CO_2$) under pressure within the green rubber tube while the mold is heated as by live steam. This internal pressure tends to force the two halves of the mold apart. Hence, it is customary at present to secure the two halves together by heavy hydraulic or mechanical locking mechanism.

The upkeep of machines of this type is a considerable item and the opening and closing is laborious and time consuming.

According to my invention, I mount the mold parts within corresponding parts of a casing which is collapsed and held together by fluid pressure difference, i. e., by suction. Hence, quick and powerful means for closing and clamping the mold is thereby provided.

A very desirable secondary result follows from this construction, namely, a saving of heat. The steam heated mold being thus disposed in a vacuum chamber loses less heat than where it is exposed directly to the atmosphere. This has the desirable result, in addition to saving the expense of the waste heat, of reducing the temperature of the room in which the operator must work, and shortening the curing time or giving better curing.

When the molds are not in use, it is customary to keep them up to a certain temperature to prevent warping by successive heating and cooling. Heretofore, much heat has thus been wasted. By my invention it is possible to save a large amount of heat, since the casing and the mold may be closed and kept under heat when not in use without the large heat losses which have heretofore occurred.

Another important result flows from the use of my invention, namely, that the suction to which the mold is subjected extends into the mold outside of the inner tube and assists in expanding the tube into contact with the walls of the mold. In other words, the suction is useful to assist in gaining the desired intimate contact between the tube and the heated walls of the mold to accelerate the transfer of heat and, consequently, the curing.

Now in order to acquaint those skilled in the art with the manner of constructing and operating a device embodying my invention, I shall describe, in connection with the accompanying drawings, a specific embodiment of the same.

In the drawings:—

Fig. 1 is a front elevation of a mold embodying my invention;

Fig. 2 is a left side elevation of the same;

Fig. 3 is a longitudinal vertical section;

Fig. 4 is a detail elevation showing the clamp for holding the valve stem of the inner tube;

Fig. 5 is a detail sectional view showing the external operating valve for admitting carbon dioxide or other inert gas to the interior of the tube while it is being cured; and Fig. 6 is a vertical cross-section of a modification.

Referring now to Figs. 1 to 5, inclusive, a base or pedestal 1 is provided and upon this is bolted the flange 2 of the stationary casing section 3. The movable casing section 4 is hinged to the stationary casing section 3 at the hinges 5—5. The hinge 5—5 has a vertical axis so that the movable casing section 4 may be swung laterally away from or towards the stationary casing section 3. The movable casing section is mounted so as to permit of a certain flexibility of mounting to permit the parts to adjust themselves to a tight fit, by providing a rigid hinge member 6 mounted on the hinge to the stationary casing section and connected to the movable casing section 4 through the medium of a bracket 7 which is formed integral with said movable section, said bracket and said hinge member 6 being connected together by a relatively thin and flexible plate 8, so that the movable casing section 4 may adapt itself to the stationary casing section 3, and the mold parts likewise may adjust themselves to each other.

Within the casing formed by these sections is disposed the steam jacketed curing mold 9 which comprises separable parts mounted on the casing sections. The mold part 10, which is the stationary part, is mounted within the casing section 3 as by means of the cap screws 11 passing through the side walls of the casing section 3 and clamping the mold part 10 to the inside of said casing section. In a like manner, the movable mold part 12 is clamped to the inside of the movable casing section 4 by the cap screws 13. The meeting surfaces of the mold parts and the casing parts are carefully machined so that the mold parts come accurately into register when the movable casing section 4 is swung about the hinge 5 to close the casing.

The stationary mold part 10 is suitably cored to provide a steam jacket and a steam inlet pipe 15 extends through the casing section and into communication with the steam jacket of the mold part 10. At the lower end of the steam jacket there is a drain pipe 16 for taking out the condensate so as to maintain live steam in contact with the mold part at all times. Likewise, the movable mold part 12 has a steam inlet pipe 17 and a drain pipe 18 at the top and bottom of the steam jacket, respectively.

The stationary mold part 10 comprises a larger part of the circumference of the cross section of the inner tube 19. That is to say, the mold is not split on a diameter. The stationary part is adapted to receive the valve stem 20 through a suitable opening, this valve stem being clamped between a pair of jaws 21—21, said jaws being forced toward each other by a spring 22 and having operating or release arms 23—23 by which the operator may readily compress the spring 22 and release the stem 20 which is normally gripped by the jaws under the influence of the expansion spring 22. The mold part 10 is adapted to receive the inner tube 19 and hold the same in position until the movable mold part may be closed upon the same, and for that reason the mold part 10 extends beyond the vertical diameter so as to give the inner tube 19 a support after it is placed in the mold part and before the other mold part is brought into register to close the mold.

The casing parts 3 and 4 are provided with extending flanges 26 and 27, respectively, a groove 28 being formed in the flange 26 and a sealing ring 29 of relatively soft rubber being mounted in said groove and being adapted to bear against the flange 27. The purpose of this connection is to provide a small amount of necessary play or telescopic action so that pressure upon the outsides of the two casing parts, as will be explained later, will be transmitted to the meeting surfaces of the mold parts to hold them firmly closed.

The stationary casing section 3 has permanent connection through the pipe 30 with a source of vacuum or atmosphere, a suitable three-way valve (not shown) being provided to admit atmosphere or to admit suction to the interior of the casing. Likewise, connection is made by pipe 31 and a suitable valve (not shown) to a source of compressed air for opening the mold quickly.

The steam connections 17 and 18 on the movable casing part 4 are preferably led back to the line of the hinge 5 either through a rotary joint or through flexible connections so that the movable casing section and its corresponding mold part may be swung to open position readily.

It is customary in curing inner tubes to partially inflate the inner tube into contact with the mold surface by pneumatic pressure, a suitable inert gas, for example carbon dioxide, being employed for this purpose.

To permit of such inflation readily, I provide the pipe connection 33 leading to a source of gas under pressure. This pipe connection extends into the interior of the casing and being connected through a suitable three-way valve 34 and pipe 31 to the open valve stem 20. The valve stem 29 does not, at this time, include a valve for the purpose of trapping pressure within the inner tube, as it is desirable to permit the pressure to escape before the molds are opened, as will be described more in detail later.

The three-way valve 34 has an operating handle 35 disposed within the casing, said handle having a telescopic chuck member 36 (see Figs. 3 and 5) which is adapted to be engaged by a cooperating clutch member 37 mounted on a stem or shaft 38 extending through the movable casing section 4 and bearing an external handle 39 disposed within the circular flange 40, which flange bears suitable indicia, as shown in Fig. 1, for indicating the position of the valve. Thus, by pushing the shaft 38 inwardly until the clutch parts 37 and 36 engage, the handle 39 may be moved to the various positions indicated to exhaust gas from the inner tube into the vacuum space in the casing section, or to shut off the connections 33 and 35 from each other and from the exhaust, or to make the connection between the gas supply pipe 33 and the hose 35 to admit carbon dioxide to the interior of the inner tube 19.

If desired, a pressure gauge may be connected between the valve 34 and the valve stem 20, so that there may be an external indication at all times of the pressure within the inner tube.

It will be observed that the casing section 3 is bulged in at the center to reduce the volumetric capacity of the casing.

A suitable vacuum and pressure gauge 42 is mounted on the movable casing section 4 to indicate the pressure difference between the inside and the outside of the casing.

The operation of the device is as follows:—

Assuming that atmospheric pressure prevails in the casing 3—4 the operator grasps the handle 43 and swings the movable casing section with its mold part about the hinge 5 to expose the stationary mold part. He then lays a green rubber tube to be cured in the stationary mold part, projecting the valve stem 20 without the valve therein, and holding the same by means of the jaws 21—21. Then he couples up the connection 31 from the valve 34 to the valve stem 20, this connection being of the usual type now employed. Then he admits a small amount of gas by operating the valve handle 35 within the casing until the inner tube is rounded, so that no part of the same will be caught by closing of the mold. Then he moves the handle 35 back to the "off" position and swings the movable casing 4 and mold part 12 into closed position, the flange 27 of the movable casing section engaging the rubber sealing ring 29 and the conical meeting edges of the mold parts engaging each other to close the mold.

The casing section 4 being closed and the valve 34 being in "off" position, suction is now admitted to the inside of the casing to create a difference in pressure between the inside and the outside of the casing, said difference in pressure holding the casing section firmly together and the entire force of said difference in pressure being exerted upon the mold parts to hold them firmly in closed position during vulcanization. As soon as a predetermined difference in pressure is created in the casing, as can be ascertained by inspection of the gauge 42, the operator depresses the operating valve stem 38 to engage the clutch parts 36 and 37, and he moves the valve 34 to the "on" position to admit gas to the interior of the inner tube 19 which is disposed within the mold. A pressure of approximately 50 to 60 pounds per square inch may be admitted to the interior of the inner tube to force the walls of the tube firmly into engagement with the surface of the mold. The pressure may then be cut off and the tube permitted to stand under pressure while it is curing, or the pressure may be maintained on continuously. I now wish to call attention to the fact that the steam heated mold 9 is disposed in a vacuum chamber and two important results flow therefrom. First, the vacuum condition extends into the interior of the mold, even though the parts are held tightly in engagement, and this action of suction is highly desirable, in that it removes any air between the surface of the tube and the surface of the mold, permitting the tube to engage firmly the mold surfaces for the better transfer of heat. At the same time, the vacuum chamber in which the mold is mounted, acts as an insulating medium, tending to retard the flow of heat outward away from the mold, since the air which remains within the casing is of exceedingly low density and, hence, by convection or contact, is unable to carry off any appreciable quantity of heat from the mold outwardly.

Considerable saving of gas may be effected by the use of the suction on the outside of the tube. For example, the actual pressure of gas ($CO_2$) upon the inside of the tube may be 40 pounds per square inch, which, in conjunction with a vacuum of 13 pounds gives a total pressure difference or effective pressure of 53 pounds per square inch between the tube wall and the mold.

It is true that radiation from the mold to the walls of the casing still may occur, but this is cut down to a minimum by polishing the inside of the casing and the outside of the mold to a smooth finish. While I prefer to polish the exterior of the mold and the interior of the casing, this is not strictly necessary, since the greater amount of heat is lost by convection in the ordinary use of the mold in the open atmosphere.

I also wish to call attention to the fact that, even if the air were not exhausted in the casing 3—4, the mere provision of an air tight casing, or substantially air tight casing about the mold, tends to cut down the heat loss and the discomfort to the operator to a very great degree.

After the inner tube has been subjected to the action of heat for a predetermined length of time, suction is cut off and then the valve 34 is operated to the exhaust position to permit the discharge of the compressed gas within the inner tube 19 to discharge into the vacuum. This expedites the operation of discharging the gas very materially and, if desired, the gas may be removed by permitting the vacuum to remain on. If the gas is not exhausted through the vacuum connection, it increases the pressure in the casing 3—4 and may thereby assist in restoring atmospheric pressure within the casing. Preferably I permit the vacuum to remain on long enough to carry off the gas, then shut off the vacuum and admit a small amount of compressed air, which immediately raises the pressure inside the casing to an amount slightly above atmosphere, whereupon, the movable casing section 4, which acts as a door, may be swung to open position. The flexible connection 31 is released and the inner tube 19 removed and the mold is ready for the next operation.

In Fig. 6 I have shown a double mold, that is, a device for curing two tubes at the same time. The mold is mounted on a pedestal 1. A central ring member 45 has an inwardly extending flange 46 extending peripherally inward, and to this flange there is bolted the central mold plate 47 closing off the central part of the ring 45 and bearing on its sides near its periphery two similar mold sections or parts 48—49. These mold parts, as explained in connection with the mold part 10 of the foregoing embodiment, comprise more than half of the periphery of the cross-section of the tube 19 which is to be cured therein. These molds are steam jacketed, and a drain connection is shown at 57 and an inlet at 58.

The outer mold parts 50 and 51 are arranged to cooperate with the inner parts 48 and 49 to close the two molds, the outer mold parts 50 and 51 being mounted on the doors or movable casing sections 52 and 53 which have flanges 27 cooperating with sealing rings 29 as previously explained in connection with Figs. 1 to 3.

The movable casing parts or doors 52 and 53 carry operating shafts 38 and handles 39, said shafts being adapted to be engaged by inward motion to the gas control valves 34—34 which, through the connection 31, are adapted to be connected to the open valve stems of the inner tubes 19—19 to be cured. It will be noted in this instance that the valve stems are not projected through a part of the mold, but lie on the division line between the mold parts for easier insertion and removal.

The gas connection 55 leads by way of a passageway 56 drilled in the central wall and extending to the valves 34—34. Each compartment of the double case has its vacuum connection 30 and its compressed air connection 31 for the same purpose as described in connection with Figs. 1 to 3.

The mode of use of the double mold shown in Fig. 6 and the details of construction which have heretofore not been mentioned, are identical with that of the embodiment described in Figs. 1 to 5.

In the mold shown in Fig. 6, two tubes may be cured at the same time, since the time required for insertion or removal is so short that by inserting the tubes in a certain definite order and removing them in the same order, they are cured to a uniform quality.

The movable doors or casing sections 52—53 are hinged to the frame ring 45 through the flexible connections provided by plates 8, as described in connection with Figs. 1 and 2.

I do not intend to be limited to the details shown or described.

I claim:—

1. In combination, a closable vessel forming a vacuum chamber, a split curing mold disposed in said chamber and arranged to be held together by the pressure on the outside of said vacuum chamber.

2. In combination, a split steam jacketed mold and an air tight case surrounding said mold.

3. In combination, a split mold comprising two complementary parts, a casing comprising two complementary parts open to each other, said casing parts bearing the mold parts, means to create a suction in the casing to hold the mold parts together and to limit the flow of heat from the mold.

4. In combination, a split mold comprising two complementary parts, a casing comprising two complementary parts open to each other, said casing parts bearing the mold parts, means to create a suction in the casing to hold the mold parts together and to limit the flow of heat from the mold, and a sealing ring for the casing parts.

5. In combination, a split mold comprising two complementary parts, a casing comprising two complementary parts open to each other pivotally connected together and bearing said mold parts, said pivotal connection including a flexible portion to facilitate seating of the mold parts together.

6. In combination, a vacuum casing, a steam heated mold therein, a gas connection adapted to be connected to a tube within the mold, said connection including a valve for admitting gas to the tube or exhausting the same while the casing and mold are closed.

7. In a heater used in the vulcanization of rubber articles, said heater comprising two disc-like members, mold parts secured to the inner sides of said disc-like members, and means for exhausting the air between said disc-like members, thereby exerting a pressure on the mold and holding them in closed position during the process of vulcanization.

8. In combination, a casing having a movable section, a split mold having a portion thereof carried by said movable casing section, feeding fluid connection to the mold section, a vacuum connection through the interior of the casing, a compressed air connection to the interior of the casing, and a gas connection leading to the interior of the casing and having a connection adapted to engage the valve stem of an article to be cured in said mold.

In witness whereof, I hereunto subscribe my name this 30th day of September, 1927.

THOMAS L. FAWICK.